United States Patent
Ye et al.

(10) Patent No.: US 9,661,615 B2
(45) Date of Patent: May 23, 2017

(54) METHOD AND APPARATUS FOR MANAGING TRUNKING OPERATIONS IN AN AD-HOC NETWORK

(71) Applicant: MOTOROLA SOLUTIONS, INC, Schaumburg, IL (US)

(72) Inventors: Jin-Qing Ye, Sichuan (CN); Ya-Ming Wu, Sichuan (CN); Zhi-Chao Zhang, Sichuan (CN); Qing-Xiao Zheng, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 19 days.

(21) Appl. No.: 14/783,256

(22) PCT Filed: Apr. 9, 2013

(86) PCT No.: PCT/CN2013/073986
§ 371 (c)(1),
(2) Date: Oct. 8, 2015

(87) PCT Pub. No.: WO2014/166074
PCT Pub. Date: Oct. 16, 2014

(65) Prior Publication Data
US 2016/0073390 A1   Mar. 10, 2016

(51) Int. Cl.
*H04W 4/00* (2009.01)
*H04W 72/04* (2009.01)
(Continued)

(52) U.S. Cl.
CPC .......... *H04W 72/0406* (2013.01); *H04B 7/14* (2013.01); *H04W 84/18* (2013.01); *H04W 84/08* (2013.01); *H04W 88/04* (2013.01)

(58) Field of Classification Search
CPC . H04W 72/0406; H04W 84/18; H04W 84/08; H04W 88/04; H04B 7/14
See application file for complete search history.

(56) References Cited

U.S. PATENT DOCUMENTS

2003/0224787 A1   12/2003   Gandolfo
2006/0002332 A1    1/2006   Diaz Cervera et al.
(Continued)

FOREIGN PATENT DOCUMENTS

WO       2012019349 A1    2/2012

OTHER PUBLICATIONS

Corresponding International Application Na PCT/CN2013/073986—International Search Report with Written Opinion—mailing date Jan. 16, 2014.

*Primary Examiner* — Abdelnabi O Musa

(57) ABSTRACT

A control unit is selected from a plurality of narrowband mobile stations also forming an ad-hoc network. The control unit is configured to control and manage a narrowband trunking operation via the ad-hoc network. The control unit receives a call request over a narrowband control channel from a first mobile station, assigns a pair of narrowband traffic channels for a call associated with the call request, chooses two mobile stations from the plurality of mobile stations to act as a narrowband repeater for the call, the pair including a respective receiver mobile station and a respective transmitter mobile station, informs the repeater mobile stations of the assignment and of the assigned traffic channels for the call, and grants the call request over the narrowband control channel. The grant includes an indication of the assigned traffic channels on which the repeater mobile stations can be located for the call.

15 Claims, 8 Drawing Sheets

(51) Int. Cl.
*H04W 84/18* (2009.01)
*H04B 7/14* (2006.01)
*H04W 84/08* (2009.01)
*H04W 88/04* (2009.01)

(56) References Cited

U.S. PATENT DOCUMENTS

| | | | |
|---|---|---|---|
| 2007/0087756 A1* | 4/2007 | Hoffberg | G06Q 10/0631 |
| | | | 455/450 |
| 2009/0232126 A1* | 9/2009 | Cordeiro | H01Q 3/26 |
| | | | 370/350 |
| 2011/0211550 A1* | 9/2011 | Suzuki | H04W 72/046 |
| | | | 370/329 |
| 2013/0078991 A1 | 3/2013 | Nam | |
| 2016/0142552 A1* | 5/2016 | Rabipour | H04M 7/0072 |
| | | | 370/328 |

* cited by examiner

METHOD AND APPARATUS FOR MANAGING TRUNKING OPERATIONS IN AN AD-HOC NETWORK

FIELD OF THE DISCLOSURE

The present disclosure relates generally to managing trunking operations in a network with a site controller and more particularly to determining a suitable group of mobile stations in an ad-hoc network to manage trunking operations in the ad-hoc network when the site controller is unavailable.

BACKGROUND

A trunked communication system, such as a Land Mobile Radio (LMR) system, is one in which mobile or portable user terminals, such as mobile telephones, portable radios or radios on vehicles (herein collectively referred to as "mobile stations") can communicate via a network infrastructure. The network infrastructure generally includes fixed installations, for example, one or more fixed base stations and/or various sub-systems that manage and control the system. The mobile stations operating in trunked communication systems share radio frequency (RF) communication channels (also referred to as traffic channels) and are configured to send and receive calls on shared traffic channels. A site controller, for example a base station, manages transmissions sent from mobile stations on free traffic channels whose availability is determined by the site controller. The site controller assigns one or more channels as the "control channel", wherein on the control channel, the site controller transmits, to the mobile stations, system information and other data associated with the shared traffic channels. The mobile stations continuously monitor the control channel so that each mobile station knows when to transmit call information on a free traffic channel.

During an emergency, the site controller may become unavailable. For example, during a natural disaster such as an earth quake or fire emergency, the base station serving as the site controller may be damaged. When the base station is unavailable, there is no way to manage the system traffic and ensure that each mobile station knows when to transmit or receive call information on a free traffic channel. During this time, although the mobile stations may also be configured to reach each other in talk around mode, in the talk around mode a mobile station can only communicate directly with another mobile station operating on the same RF channel. By using only one channel for communications in talk around mode, the mobile stations cannot share traffic channels and otherwise engage in trunking operations.

The mobile stations may further be configured to form an ad-hoc network. An "ad-hoc network" refers to a self-configuring network of geographically-distributed mobile stations connected by wireless links (e.g., radio frequency communication channels). The ad-hoc networks could be built based on a wide band protocol, such as Wi-Fi, Bluetooth, or Zigbee. The mobile stations can communicate with each other over a wireless media without the support of an infrastructure-based or wired network. Links or connections between these mobile stations can change dynamically in an arbitrary manner as existing mobile stations move within the ad-hoc network, as new mobile stations join the ad-hoc network, or as existing mobile stations exit the ad hoc network. One characteristic of the mobile stations is that each mobile station can directly communicate over a short range with mobile stations which are a single "hop" away. Mobile stations in direct communication are sometimes referred to as "neighbor mobile stations."

Although the mobile stations may be configured to form an ad-hoc network when the base station is unavailable, even if the mobile stations have access to the shared traffic channels, it is difficult to select one or more mobile stations to act as the site controller because of the dynamic nature of ad-hoc networks. Furthermore, because mobile stations in the ad-hoc network, can directly communicate over a short range, there is a need to repeat information when a sending mobile station is more than a hop away from a receiving mobile station.

Accordingly, there is a need for an improved method and apparatus for determining a suitable group of mobile stations in an ad-hoc network to manage trunking operations in the ad-hoc network when the site controller is unavailable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
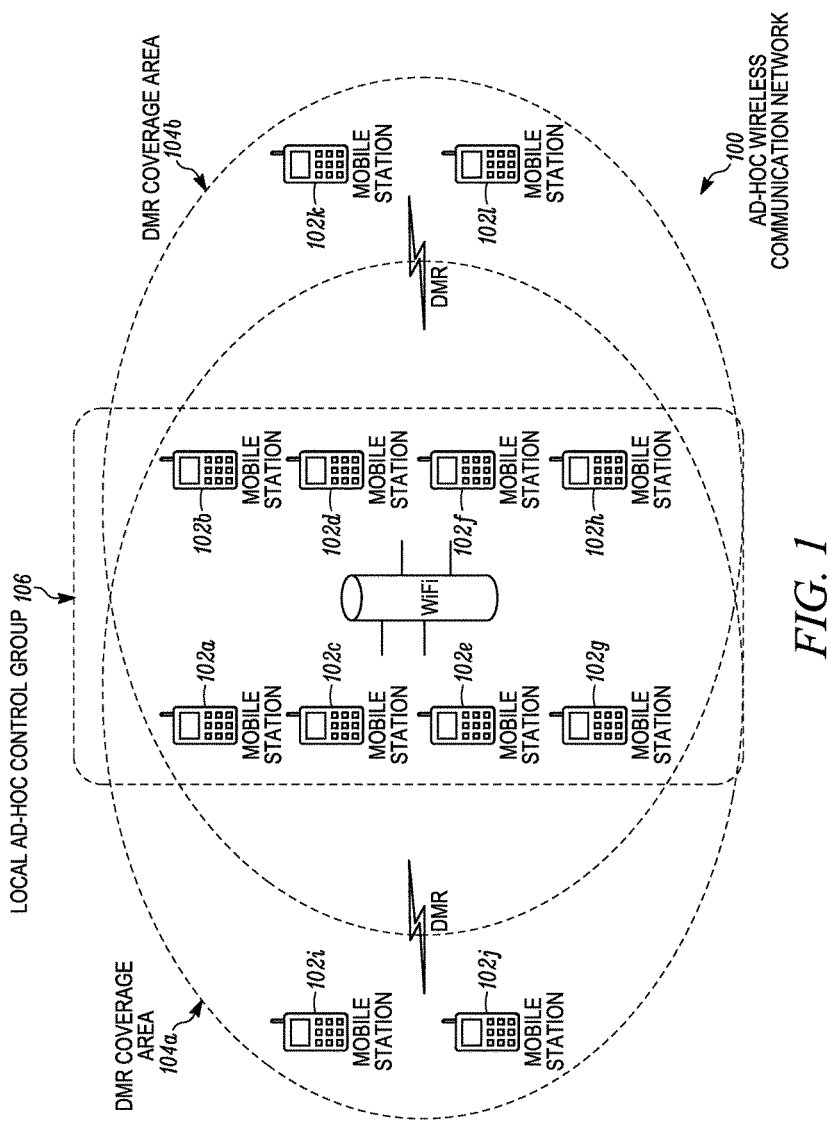
FIG. 1 is a block diagram of an ad-hoc wireless communication network used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for determining a suitable group of mobile stations in an ad-hoc network to manage trunking operations in the ad-hoc network when the site controller is unavailable. A control unit is selected from a plurality of narrowband mobile stations also forming an ad-hoc network according to a wide band protocol. The control unit is configured to control and manage a narrowband trunking operation via the ad-hoc network. The control unit receives a call request over a narrowband control channel from a first mobile station of the plurality of mobile station, assigns at least one narrowband traffic channel from a plurality of available narrowband traffic channels for a call associated with the call request, chooses two mobile stations from the plurality of mobile stations to act as a narrowband repeater for the call, the pair including a respective receiver mobile station and a respective transmitter mobile station, informs the receiver mobile station and the transmitter mobile station of the assignment to act as the repeater for the call and of the at least one assigned traffic channel for the call, and grants the call request over the narrowband control channel. The grant includes an indication of the assigned traffic channel(s) on which the respective receiver mobile station and transmitter mobile station in the repeater pair can be located for the call.

FIG. 1 is a block diagram of an ad-hoc wireless communication network 100 used in accordance with some embodiments of the present disclosure. Ad-hoc wireless communication network 100 (also referred to as an ad-hoc network 100, an ad-hoc trunking network 100, or network 100) may include multiple mobile or portable user terminals which may be, for example, mobile telephones, portable radios, or radios on vehicles (herein collectively referred to as "mobile stations" 102). Each mobile station 102 operates within at least one coverage area 104. For example, mobile stations 102a-102j may be associated with a first Digital Mobile Radio (DMR) coverage area 104a and mobile stations 102a-102h, 102k, and 102l may be associated with a second DMR coverage area 104b. Mobile stations 102a-102h may operate within both DMR coverage areas 104a and 104b. Mobile stations 102 may operate in accordance with any standard or digital voice communication protocol, including, but not limited to, DMR, Project 25 (P25), Terrestrial Trunk Radio (TETRA), and other Land Mobile Radio (LMR) radio protocols. In order to share system resources, such as radio frequency (RF) communication channels, ad-hoc network 100 may utilize multiple access schemes such as orthogonal frequency division multiple access (OFDMA), time division multiple access (TDMA), Frequency Division Multiple Access (FDMA), or Carrier Sense Multiple Access (CSMA).

Mobile stations 102 may also be associated with a trunked communication system (not shown), wherein mobile stations 102 can communicate via a network infrastructure, such as a fixed base station (not shown). The base station may be configured as a site controller to control and manage the trunked communication system. When associated with the trunked communication system, mobile stations 102 share RF communication channels (also referred to herein as narrowband traffic channels or traffic channels). The site controller approves transmissions from mobile stations 102 on free narrowband traffic channels whose availability is determined the site controller. The site controller assigns one or more channels as the "control channel" (also referred to herein as a narrowband control channel or a control channel) and uses the narrowband control channel to transmit system data and other information associated with the shared narrowband traffic channels to mobile stations 102. Each mobile station 102 knows when to transmit information on a free narrowband traffic channel by continuously monitoring the narrowband control channel.

During a situation where the site controller becomes unavailable or is otherwise overloaded because of high demand, mobile stations 102 may form ad-hoc trunking network 100. In forming ad-hoc trunking network 100, mobile stations 102 may be linked to each other via a wideband protocol, such as Wi-Fi. In an embodiment when the site controller is unavailable, mobile stations 102 are configured to organize into an ad-hoc trunking network, as shown for example in FIG. 1, to continue to share narrowband traffic channels without the site controller. One mobile station is assigned or "voted" to be a system control unit which builds, controls, and manages the ad-hoc trunking network. The role of the system control unit is to receive call requests from other mobile stations in ad-hoc trunking network 100 over a control channel, select a traffic channel for a call request from a pool of narrowband traffic channels, select two mobile stations to perform the role of a repeater for the call (one of the selected mobile station serves as a receiver and the other as a transmitter), inform those two mobile stations of their roles via ad-hoc trunking network 100, grant the call request over the control channel, and periodically broadcast system information messages, including all ongoing calls, on the control channel.

For example, if mobile station 102a is assigned or "voted" to be the system control unit for ad-hoc trunking network 100, after being assigned as the system control unit, mobile station 102a accesses the narrowband control channel (also referred to as an RF control channel when it is being controlled by a mobile station in an ad-hoc network). Mobile station 102a may be pre-configured with information associated with determining/accessing the RF control channel and with information associated with accessing the narrowband traffic channels (also referred to as an RF traffic channels when it is being controlled by a mobile station in the ad-hoc network) used in the trunking system. For example, mobile station 102a may be configured to access a database of available licensed LMR channels. The database of available licensed LMR channels may include the same licensed LMR channels as those that were being assigned by the failed site controller. The mobile station 102a could then access the database and assign available traffic channels from the database for trunking operations when the site controller is unavailable. Mobile stations 102b-102l monitor the RF control channel to determine when to transmit information on the assigned narrowband traffic channels. Mobile station 102a will periodically broadcast ongoing call and system information messages to mobile stations 102b-102l via the RF control channel. Mobile station 102a may broadcast the call information itself or it may select one or more mobile stations to act as transmission units and send the call information. For example, mobile station 102a may select mobile station 102b to serve as a transmission unit and periodically broadcast ongoing call and system information messages to mobile stations 102b-102l.

When a mobile station, for example, mobile station 102i needs to make a call on a traffic channel, mobile station 102i sends a call request message to mobile station 102a. To extend the RF coverage in ad-hoc trunking network 100, after receiving the call request message, mobile station 102a is configured to select one or more pairs of mobile stations to repeat the call on a broadband traffic channel, wherein one mobile station of the pair is selected as a receiver and the other mobile station of the pair is selected as a transmitter of the call. Each repeater pair may include mobile stations that are one hop neighbors (also referred to as one-hop neighbor mobile stations) to minimize the audio delay associated with the call. Mobile station 102a sends a channel assign message, including an inbound and/or outbound frequency value, to the repeater mobile stations via the RF control channel. After receiving the channel assign message from the RF control channel, the repeater mobile stations go to the assigned traffic channel to receive and/or transmit the call. When mobile stations 102 use TDMA to access slots on the RF control and/or traffic channels, the control channel and traffic channels transmission/reception frequency may be the same (different slots may be used for transmission and/or reception) or the control channel and traffic channels transmission/reception frequency can be different.

In an example where mobile station 102i wants to make a call to mobile station 102l, mobile station 102i sends a call request to mobile station 102a. After receiving the call request, mobile station 102a selects a pair of mobile stations to act as a repeater, for example, mobile stations 102c and 102d, and informs mobile stations 102c and 102d of their roles. When mobile stations 102 use TDMA to access slots on the RF channels, mobile station 102a sends a channel assign message, including an inbound and/or outbound frequency value, to the repeater mobile stations via the RF control channel. Of the selected pair, mobile station 102c, serving as the receiver, receives call information from mobile station 102i over a narrowband traffic channel and relays the call information to mobile station 102d, serving as the transmitter, using a wideband ad-hoc protocol. For example, mobile station 102c may relay the call information to mobile station 102d according to Wi-Fi protocol. Mobile station 102d then forwards to call to mobile station 102l over a narrowband traffic channel. To avoid interference, the narrowband traffic channel(s) used for sending information from mobile stations 102i and 102d may be separated by time, frequency, or code.

If the narrowband traffic channel used by mobile station 102i to send the call information to mobile station 102c is on the same frequency as the narrowband traffic channel used by mobile station 102d to forward the call information to mobile station 102l, mobile station 102d may also receive the call from mobile station 102i if both mobile stations 102c and 102d are within reception range of mobile station 102i. In this case, mobile station 102d may also attach a transmit unit ID (TUID) to information it sends out to mobile station 102l. When mobile station 102d sends the call information with the TUID to mobile station 102l, mobile station 102c operating on the same frequency channel can use the TUID to distinguish the data from mobile station 102d and not send that data back over the wideband connection.

When mobile station 102a is selected to be the system control unit, mobile station 102a may form a local ad-hoc control group 106. Local ad-hoc control group 106 includes the system control unit (mobile station 102a), a system transmission unit (for example, mobile station 102b), and repeaters selected by mobile station 102a, for example, one-hop neighbor mobile stations 102c-102d, 102e-102f, and 102g-102h. Each mobile station in local ad-hoc control group 106 is connected to the first and second coverage areas 104 in ad-hoc network 100.

To identify the best group of ad-hoc mobile stations for the local ad-hoc control group, the system control unit may identify different ad-hoc groups that cover the same RF range. Every ad-hoc network group may also include a sub-system control unit. In FIG. 1, mobile station 102b may be the sub-system control unit and is responsible to assist the system control unit (mobile station 102a) in managing ad-hoc trunking network 100. The sub-system control unit (for example mobile station 102b) may replace the current system control unit (for example mobile station 102a) if the sub-system control unit finds it is more suitable than the current system control unit, based on a predefined formula. For example, the sub-system control unit may be deemed more suitable to be the control unit based on an ad-hoc group unit number associated with the sub-system control unit, the number of its one-hop pair neighbors and the aggregate of all one-hop neighbor mobile stations in an ad-hoc group with the sub-system control unit. If the sub-system control unit has the highest ad-hoc group unit number, the highest number of its one-hop pair neighbors and the highest aggregate of all one-hop neighbor mobile stations in an ad-hoc group, the sub-system control unit may become the system control unit.

Mobile station 102a may be preconfigured to be the system control unit and when the site controller becomes unavailable, mobile station 102a may "vote" itself to be the system control unit. For example, mobile station 102a may be pre-configured with a value that indicates it is to be assigned the role of system control unit. Responsive to determining that the site controller is unavailable, mobile station 102a may broadcast this value to all mobile stations in the trunking system in system announcement messages on the RF control channel. For example, if mobile station 102 is a highly stable mobile station, it may be pre-configured with a "must be system control unit" value. Only one mobile station in an ad-hoc network may be pre-configured with the "must be system control unit" value, wherein when mobile station 102 is pre-configured with this value, other mobile stations 102b-102l may not self vote or otherwise try to be the system control unit.

When mobile stations 102 determine that the site controller is unavailable, assuming that one mobile station is not pre-configured to be the system control unit, a selection process is performed over ad-hoc network 100 to choose one mobile station to be the system control unit. In an embodiment, a mobile station that is connected to the most mobile stations via one hop may be selected as the system control unit. In the case where a selection process is carried out, each mobile station 102 that is capable of being the system control unit may be pre-configured with information associated with determining/accessing the RF control channel and with information associated with determining/accessing narrowband traffic channels used in the trunking system. This enables each mobile station 102 that is capable of being the system control unit to continue to assign narrowband traffic channels for trunking operations when the site controller is unavailable. Each mobile station 102 may broadcast a keep-alive message with its identifier and status via the ad-hoc network. Each mobile station receiving these broadcasts may keep a list of all identifiers for its one hop neighbors and broadcasts this information in keep-alive messages to inform the system control unit of its one hop neighbors. Based on the keep-alive messages, mobile stations 102 are able to determine which mobile station has the most one-hop neighbor, and should thus be the system control unit.

Figure 2:
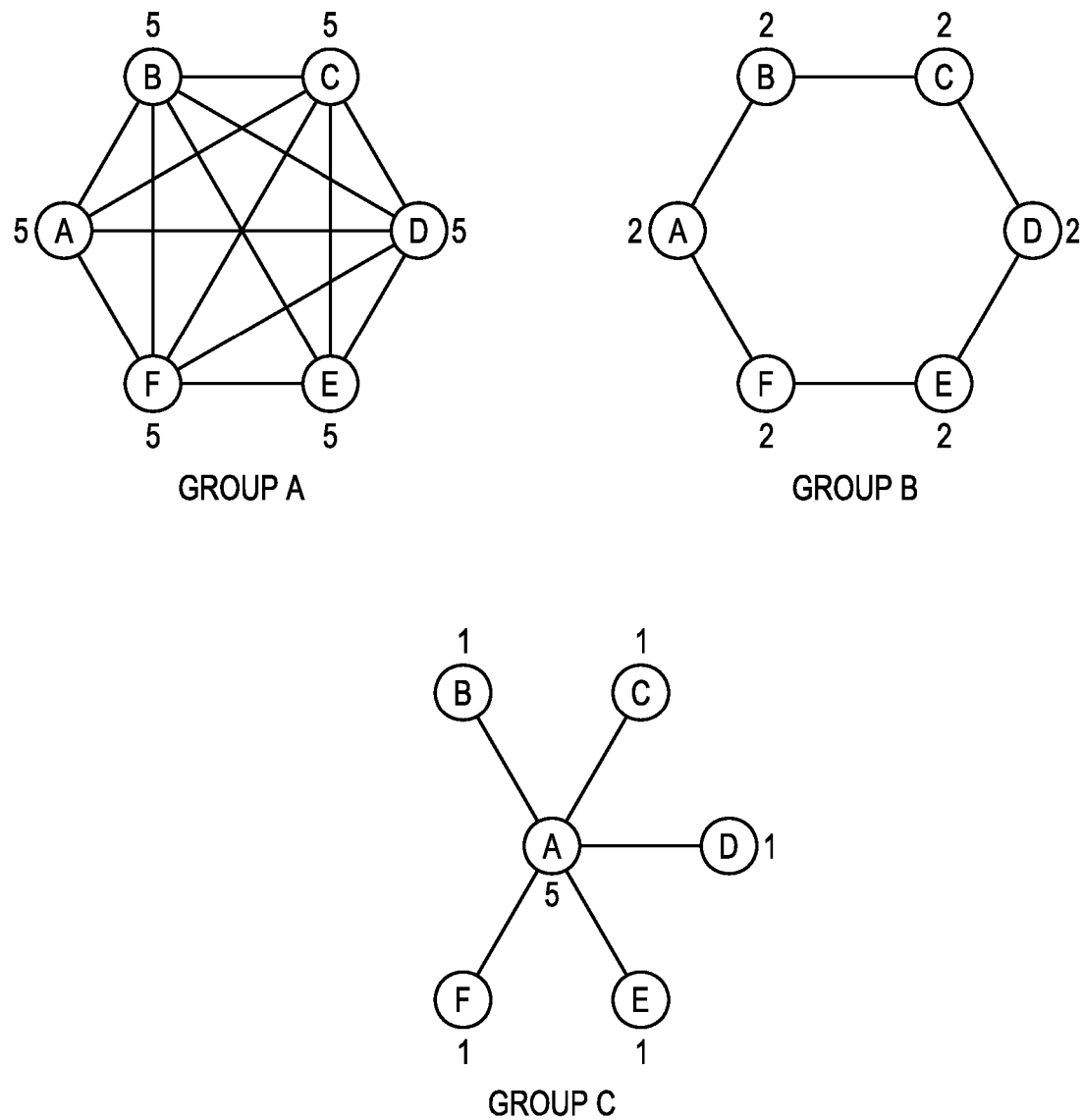
FIG. 2 is a block diagram of different topologies associated with mobile stations within a given range in accordance with some embodiments.

FIG. 2 is a block diagram of different topologies associated with mobile stations within a given range in accordance with some embodiments. Based on the keep-alive messages, the mobile stations may form different topologies shown, for example, in groups A-C. Based on the topologies shown in FIG. 2, the system control unit is likely to be selected from the group with the maximum number of repeater pairs (i.e., the group with the maximum number of one-hop neighbor mobile stations) and from the group where the members are closer to each other than other groups. Accordingly, the system control unit is likely to be selected from group A because each mobile station in group A has the highest number of one-hop neighbors. Therefore, group A can produce the highest number of repeater pairs and group A has the highest aggregate of one-hop neighbors for all mobile stations. Depending on movement within the network, each group A-C may or may not have an audio hole, wherein a repeater pair identified within the group can longer be used. When a group has an audio hole, the system control unit may find a replacement repeater pair.

A mobile station may also be pre-configured with a "never to be repeat pair" value so it will not participate in the self voting for the system control unit. Any mobile station in the network may self vote to be the system control unit if it not configured with the "never to be repeat pair" value, there is no system control unit in its one-hop neighborhood, there is no mobile station configured with the "must be system control unit" value, and one or more of its one-hop neighbors is not configured with the "never to be repeat pair" value.

The current sub-system control unit and/or system control unit may also select a new sub-system control unit and/or system control unit from among local ad-hoc networks neighbors when the current sub-system control unit and/or system control unit can no longer be the control unit(s). Mobile stations in ad-hoc networks are configured to continuously receive keep-alive messages from the current sub-system control unit and/or system control unit. If the keep-alive messages from the current sub-system control unit and/or the system control unit are lost, the network neighbors may vote for a new sub-system control unit and/or system control unit. For example, the network neighbors may vote for the unit with the largest number of one-hop neighbors as a replacement control unit. In another example, the priority for the network neighbors may be dynamically configured, wherein one type of mobile station, for example a mobile unit, may be assigned a higher priority than another type of mobile station, for example portable unit. Therefore, using this example, the mobile unit may be selected as the new sub-system control unit or system control unit.

Figure 3:
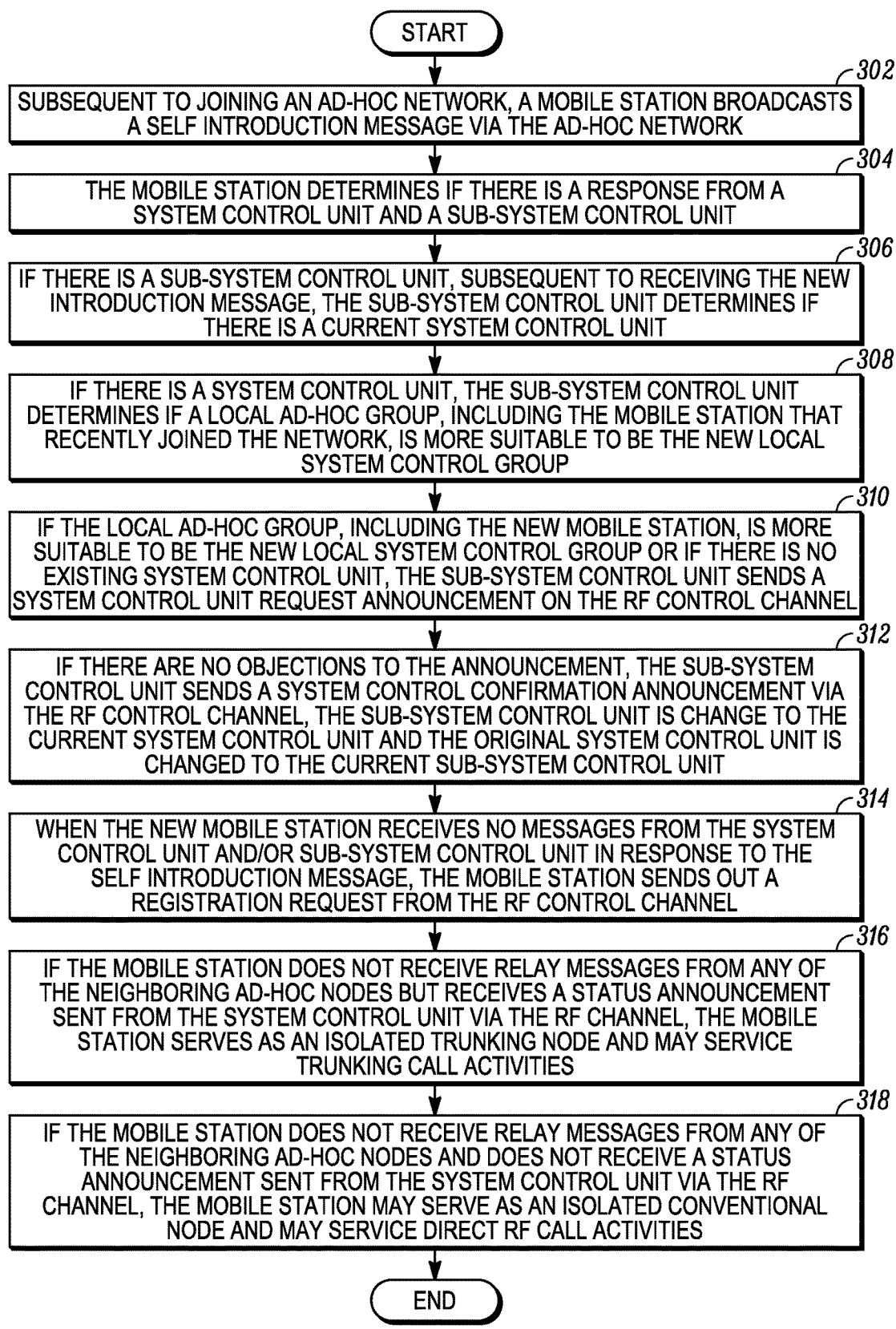
FIG. 3 is a flow diagram of how a system control unit may be changed in accordance with some embodiments.

FIG. 3 is a flow diagram of how the system control unit may be changed in accordance with some embodiments. At 302, subsequent to joining an ad-hoc network, the mobile station broadcasts a self introduction message via the ad-hoc network. If the mobile station receives relay messages from a neighboring ad-hoc mobile stations, at 304, the mobile station determines if there is a response from a system control unit and a sub-station control unit. At 306, if there is a sub-system control unit, responsive to receiving the new introduction message, the sub-system control unit determines if there is a current system control unit. At 308, if there is a system control unit, the sub-system control unit determines if a local ad-hoc group, including the mobile station that recently joined the network, is more suitable to be the new local system control group. At 310, if the local ad-hoc group, including the new mobile station, is more suitable to be the new local system control group or if there is no existing system control unit, the sub-system control unit sends a system control unit request announcement on the RF control channel. The announcement includes the local ad-hoc group unit number, the number of one-hop pair neighbors in the ad-hoc group and the aggregate of all one-hop neighbor mobile stations in the ad-hoc group. At 312, if there are no objections to the announcement, the sub-system control unit sends a system control confirmation announcement via the RF control channel, the sub-system control unit is change to the current system control unit and the original system control unit is changed to the current sub-system control unit. At 314, when the new mobile station receives no messages from the system control unit and/or sub-system control unit in response to the self introduction message, the mobile station sends out a registration request from the RF control channel.

At 316, if the mobile station does not receive relay messages from any of the neighboring ad-hoc mobile stations but receives a status announcement sent from the system control unit via the RF channel, the mobile station serves as an isolated trunking mobile station and may service trunking call activities. The mobile station may now become the new sub-system control unit and subsequent to becoming the sub-system control unit, the mobile station may receive self-introduction messages from new mobile stations joining the ad-hoc network and reply to the self introduction messages as the sub-system control unit. At 318, if the mobile station does not receive relay messages from any of the neighboring ad-hoc mobile stations and does not receive a status announcement sent from the system control unit via the RF channel, the mobile station may serve as an isolated conventional mobile station and may service direct RF call activities.

Figure 4:
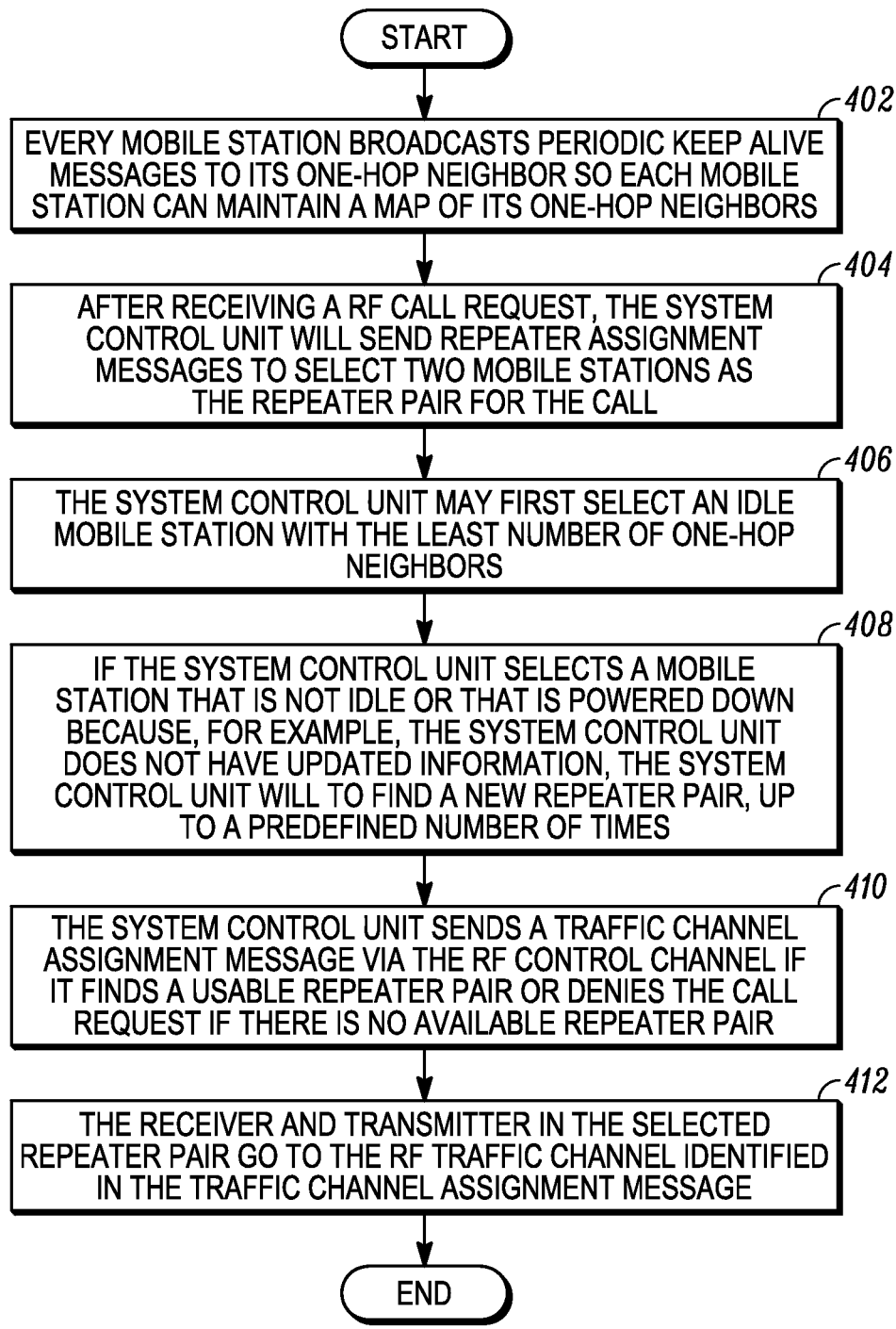
FIG. 4 is a flow diagram for reducing message relays in accordance with some embodiments.

FIG. 4 is a flow diagram for reducing message relays in accordance with some embodiments. The number of hops from a receiver to a transmitter in a repeater pair of mobile stations may be limited to one hop. At 402, every mobile station broadcasts periodic keep alive messages to its one-hop neighbor so each mobile station can maintain a map of its one-hop neighbors. Each mobile station also sends periodic keep alive messages to the system control unit and/or sub-system control unit with a map of its one-hop neighbors. At 404, after receiving a RF call request, the system control unit will send repeater assignment messages to select two mobile stations as the repeater pair for the call. At 406, the system control unit may first select an idle mobile station with the least number of one-hop neighbors. At 408, if the system control unit selects a mobile station that is not idle or that is powered down because, for example, the system control unit does not have updated information, the system control unit will to find a new repeater pair, up to a predefined number of times, for example, up to three times. At 410, the system control unit sends a traffic channel assignment message via the RF control channel if it finds a usable repeater pair or denies the call request if there are no available repeater pair. At 412, the receiver and transmitter in the selected repeater pair go to the RF traffic channel identified in the traffic channel assignment message.

Figure 5:
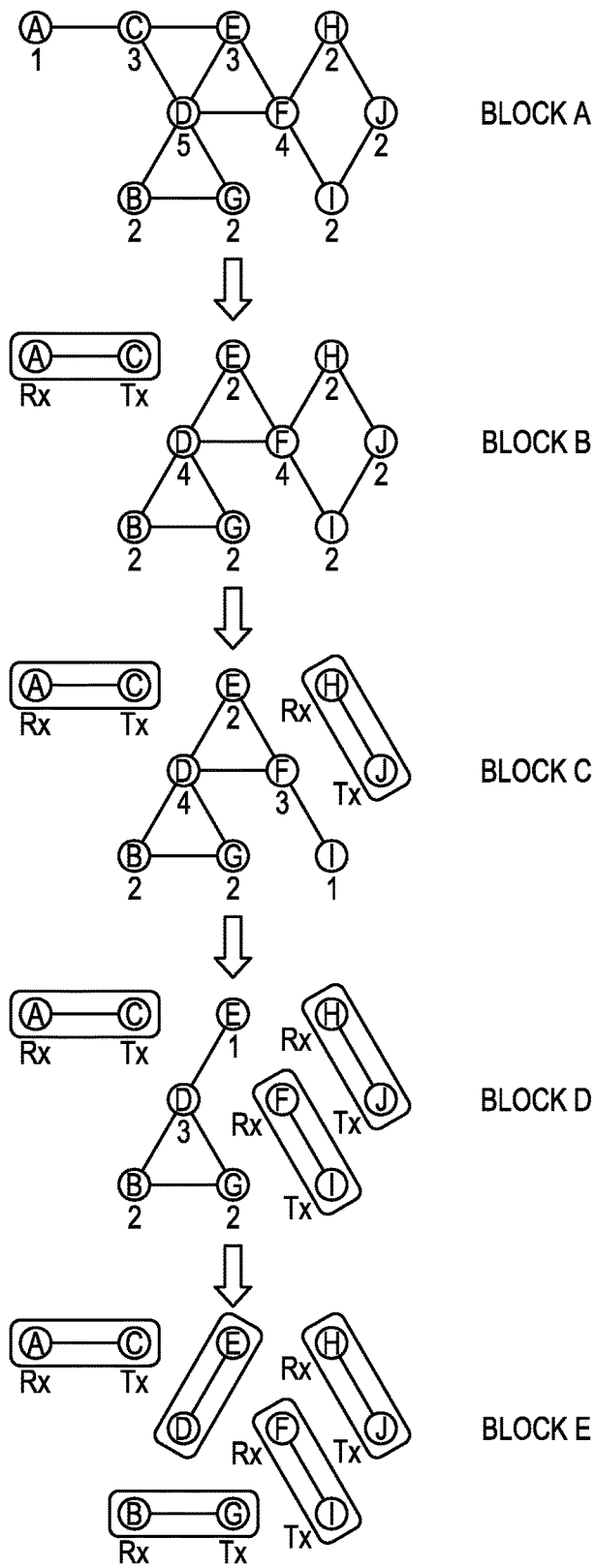
FIG. 5 is a block diagram of how repeater pairs are selected in accordance with some embodiments.

FIG. 5 is a block diagram of how repeater pairs are selected in accordance with some embodiments. Assume that each circle in FIG. 5 represents a mobile station. After each of the mobile stations shown in block A powers up, it broadcast its neighboring mobile station information to all of its one-hop neighbors. Of the ten mobile stations shown, mobile station A can directly connect with only mobile station C. Therefore mobile station A has only 1 neighboring mobile station. In block B, because mobile stations A and C have the smallest number of neighboring mobile stations and mobile station A has only 1 neighboring mobile station, mobile stations A and C are the first mobile stations to be selected as a repeater pair. Using this formula, in block C, mobile stations H and J are selected as the next mobile stations to be a repeater pair. In block D, mobile stations I and F are selected as the next mobile stations to be a repeater pair, and in block E, mobile stations D and E and mobile stations B and G are selected as repeater pairs. Because each repeater pair is directly connected by one hop, this reduces delays associated with forwarding the call.

Figure 6:
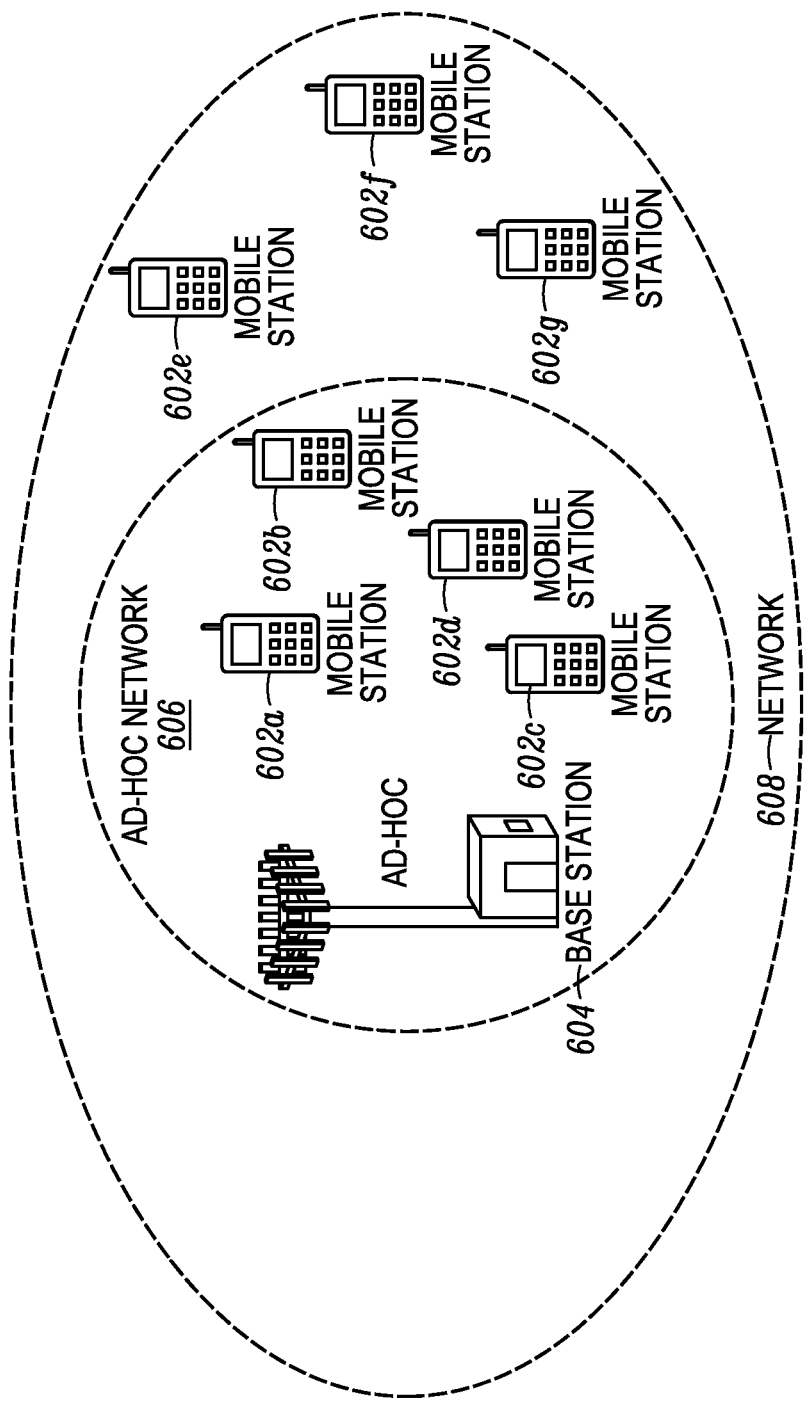
FIG. 6 is a block diagram of a network where a site controller is overloaded in accordance with some embodiments.

FIG. 6 is a block diagram of a network where the site controller is overloaded in accordance with some embodiments. A site controller, for example, base station 604 communicates with mobile stations 602 via a narrowband protocol, forming network 608. Any mobile station, for example mobile stations 602a-602d, can communicate with base station 604 via a wide band protocol. This forms an ad-hoc network 606 between base station 604 and the mobile stations 602a-602d that are communicating via the wide band protocol. Base station 604 may still communicate with mobile stations 602 via the narrowband protocol. When there are available narrowband traffic channels but, for example, a shortage or repeater devices in the trunking system, subsequent to forming ad-hoc network 606 with mobile stations 602a-602d, base station 604 may select mobile stations 602a and 602b and/or mobile stations 602c and 602d to act as repeaters and supply new traffic channel(s) during peak times.

To reduce the power consumption when the mobile stations are connected to a network infrastructure with a site controller and to enhance stability, the mobile stations may be configured with different priority levels for determining if a mobile station is to start organizing an ad-hoc trunking network when the site controller is unavailable or otherwise overloaded. Each mobile station and network infrastructure element may be configured with a priority level. For example, if 1 is the highest priority level, a base station controller repeater could be assigned a priority of 1 and other repeaters in the network could be assigned a priority of 2. A mobile station configured with a "must be system control unit" value may be assigned a priority of 3. Other mobile stations may be assigned lower priority levels, depending on traffic patterns and/or roles to be played by these mobile stations. The site controller may broadcast a current trunking priority in a system message on the RF control channel. If the current trunking priority is set at, for example 2, only those units (in the example above—repeaters) may communicate via an ad-hoc protocol. Accordingly, when the network infrastructure and site controller are available the mobile stations will not transmit call information on ad-hoc channels, thereby reducing power consumption.

If the site controller becomes unavailable, it will stop broadcasting the current trunking priority on the RF control channel. In some embodiments, the system may be configured to automatically broadcast the next lower priority level as soon as the site controller becomes unavailable. When the mobile stations see the lower priority level or no priority level, they will begin to form the ad-hoc trunking system. In this example, the mobile station configured with a "must be system control unit" may vote itself to be the system control unit and begin to organize the ad-hoc trunking network because it has a higher priority level than other mobile stations.

Figure 7:
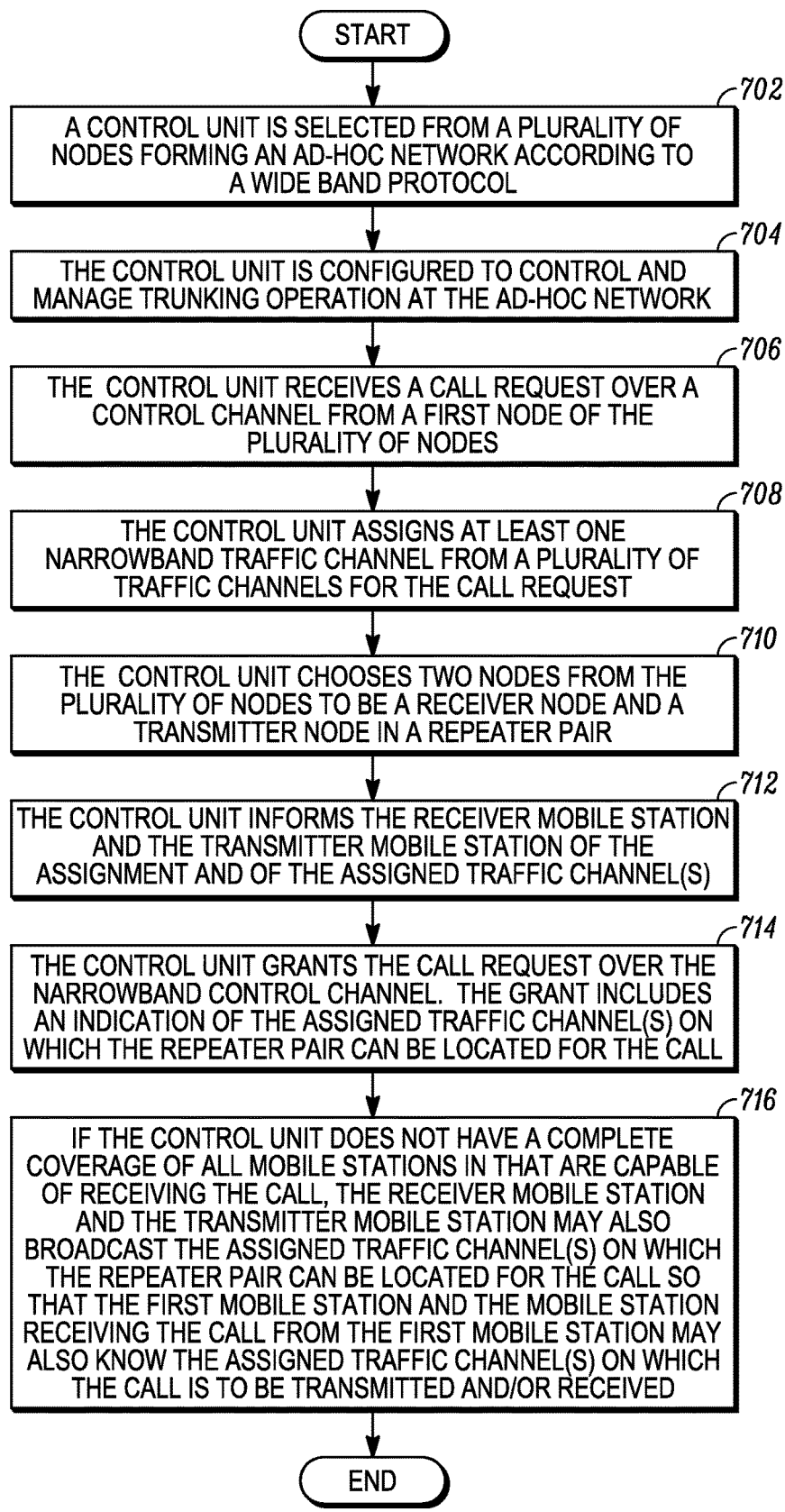
FIG. 7 is a flow diagram for determining a suitable group of mobile stations in an ad-hoc network to manage trunking operations in the ad-hoc network when the site controller is unavailable in accordance with some embodiments.

FIG. 7 is a flow diagram for determining a suitable group of mobile stations in an ad-hoc network to manage trunking operations in the ad-hoc network when the site controller is unavailable in accordance with some embodiments. At 702, a control unit is selected from a plurality of narrowband mobile stations forming an ad-hoc network according to a wide band protocol. At 704, the control unit is configured to control and manage trunking operation at the ad-hoc network. At 706, the control unit receives a call request over a narrowband control channel from a first mobile station of the plurality of narrowband mobile stations. At 708, the control unit assigns at least one narrowband traffic channel from a plurality of traffic channels for the call request. At 710, the control unit chooses two mobile stations from the plurality of mobile stations to be a receiver mobile station and a transmitter mobile station in a repeater pair. At 712, the control unit informs the receiver mobile station and the transmitter mobile station of the assignment and of the assigned traffic channel(s). At 714, the control unit grants the call request over the narrowband control channel. The grant includes an indication of the assigned traffic channel(s) on which the repeater pair can be located for the call. At 716, If the control unit does not have a complete coverage of all mobile stations in that are capable of receiving the call, the receiver mobile station and the transmitter mobile station may also broadcast the assigned traffic channel(s) on which the repeater pair can be located for the call so that the first mobile station and the mobile station receiving the call from the first mobile station may also know the assigned traffic channel(s) on which the call is to be transmitted and/or received.

Figure 8:
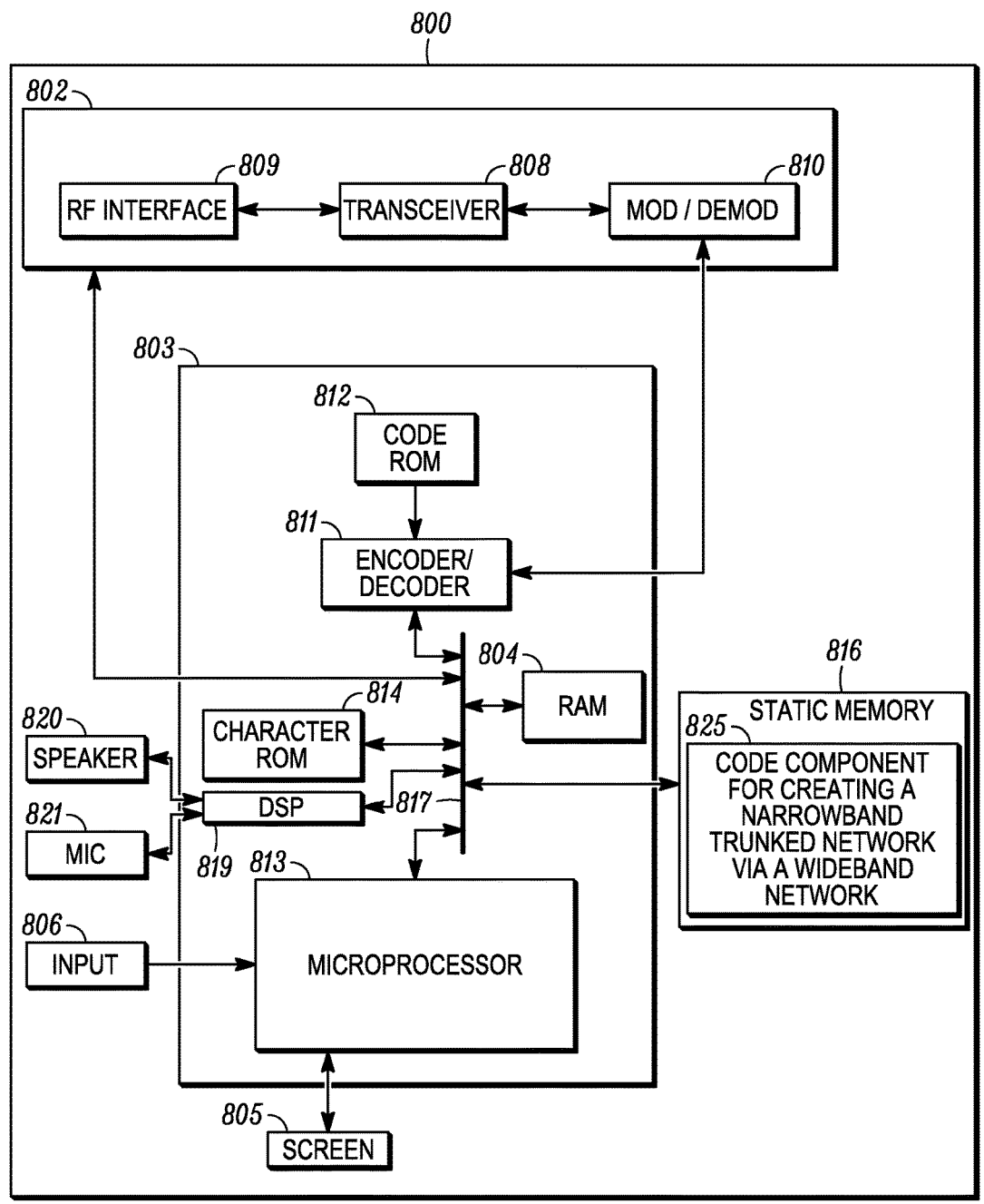
FIG. 8 is an example of internal functional block diagrams of a mobile station that may operate in the system shown in FIG. 1.

FIG. 8 is an example of internal functional block diagrams of a mobile station such as mobile station 102 of FIG. 1 that may operate in system 100 in accordance with some embodiments. Other mobile devices may contain same or similar structures. As shown in FIG. 8, mobile station 800 includes a communications unit 802 coupled to a common data and address bus 817 of a processing unit 803. The mobile device 102 may also include an input unit (e.g., keypad, pointing device, etc.) 806, an output transducer unit (e.g., speaker) 820, an input transducer unit (e.g., a microphone) 821, and a display screen 805, each coupled to be in communication with the processing unit 803.

The processing unit 803 may include an encoder/decoder 811 with an associated code ROM 812 for storing data for encoding and decoding voice, data, control, or other signals that may be transmitted or received between base stations or other mobile stations. The processing unit 803 may further include a microprocessor 813 coupled, by the common data and address bus 817, to the encoder/decoder 811, a character ROM 814, a RAM 804, and a static memory 816. The processing unit 803 may also include a digital signal processor (DSP) 819, coupled to the speaker 820, the microphone 821, and the common data and address bus 817, for operating on audio signals received from one or more of the communications unit 802, the static memory 816, and the microphone 821.

The communications unit 802 may include an RF interface 809 configurable to communicate with other subscriber devices within its communication range and with base stations and other mobile stations within its communication range. The communications unit 802 may include one or more broadband wireless transceivers 808, such as an Long Term Evolution (LTE) transceiver, a Third Generation (3G) (3GGP or 3GGP2) transceiver, a WiMAX transceiver perhaps operating in accordance with an IEEE 802.16 standard, and/or other similar type of wireless transceiver configurable to communicate via a wireless network, for infrastructure communications. Additionally or alternatively, communication unit 802 may include one or more second narrowband radio transceivers such as an APCO P25 transceiver, a DMR transceiver, a TETRA transceiver, or one or more second local area network or personal area network transceivers such as Wi-Fi transceiver perhaps operating in accordance with an IEEE 802.11 standard (e.g., 802.11a, 802.11b, 802.11g) or a Bluetooth transceiver, for subscriber device to subscriber device communications. The transceiver 808 is also coupled to a combined modulator/demodulator 810 that is coupled to the encoder/decoder 811. The character ROM 814 stores code for decoding or encoding data such as control, request, or instruction messages, channel change messages, and/or data or voice messages that may be transmitted or received by the mobile station 800.

Static memory 816 may store operating code 825 for the microprocessor 813 that, when executed, causes the mobile station 800 to create a narrowband trunked network via a wideband network, in accordance with one or more steps as set forth in FIGS. 3-4 and 7 and corresponding text. Static memory 816 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for creating a narrowband trunked network via a wideband network, the method comprising:
   selecting, from a plurality of narrowband mobile stations also forming an ad-hoc network according to a wide band protocol, a control unit, wherein the control unit is configured to control and manage a narrowband trunking operation via the ad-hoc network; and
   receiving, by the control unit, a call request over a narrowband control channel from a first mobile station of the plurality of mobile station, assigning at least one narrowband traffic channel from a plurality of available narrowband traffic channels for a call associated with the call request, choosing two mobile stations from the plurality of narrowband mobile stations to act as a repeater for the call, the two mobile stations including a respective receiver mobile station and a respective transmitter mobile station;
   informing the receiver mobile station and the transmitter mobile station of the assignment to act as the repeater for the call and of the at least one assigned traffic channel for the call, and
   granting the call request over the narrowband control channel including indicating the at least one assigned traffic channel on which the respective receiver mobile station and the respective transmitter mobile station can be located for the call;

wherein the control unit periodically broadcasts ongoing call information and system information on the narrowband control channel and the plurality of narrowband mobile stations monitor the narrowband control channel to determine when to transmit information on one of the plurality of narrowband traffic channels.

2. The method of claim 1, wherein subsequent to the call request being granted, the call is sent from the first mobile station over the at least one assigned traffic channel to the receiver mobile station, the receiver mobile station forwards the call to the transmitter mobile station via the ad-hoc network, and the transmitter mobile station forwards the call to a second mobile station from the plurality of mobile stations over the at least one assigned traffic channel.

3. The method of claim 1, wherein:
the choosing comprises assigning a pair of one-hop neighbor mobile stations to be the respective receiver mobile station and the respective transmitter mobile station in the pair; and
the informing comprises sending a message with at least one of an inbound and an outbound frequency value to the respective receiver mobile station and the respective transmitter mobile station in the pair.

4. The method of claim 1, wherein the selecting comprises selecting a mobile station with at least one of a highest priority or a highest ad-hoc group unit number, a highest number of one-hop pair neighbors and a highest aggregate of all one-hop neighbor mobile stations in an ad-hoc group.

5. The method of claim 1, wherein the selecting comprises selecting a mobile station that is preconfigured with a value that indicates that the mobile station is to be selected as the control unit, wherein one mobile station of the plurality of narrowband mobile stations is preconfigured with the value.

6. The method of claim 1, further comprising forming, by the control unit, a local control group including the control unit, a transmission unit, and at least one repeater pair.

7. The method of claim 5, further comprising identifying a plurality of ad-hoc topologies, wherein the control unit is selected from an ad-hoc topology with a highest number of repeater pairs and a highest aggregate of one-hop neighbors and wherein when one of the ad-hoc topologies has an audio hole, the control unit is configured to select a new repeater pair.

8. The method of claim 1, wherein the selecting further comprises selecting a sub-control unit to assist the control unit in managing and controlling the ad-hoc network, wherein the sub-control unit is configured to replace the control unit if the sub-control unit is determined to be more suitable to control and manage the ad-hoc network.

9. The method of claim 1, wherein the selecting further comprises selecting a new control unit by at least one of the control unit or a sub-control unit when the control unit can no longer control and manage the ad-hoc network.

10. The method of claim 1, wherein the choosing the two mobile stations from the plurality of narrowband mobile stations to act as the repeater for the call comprises selecting a first idle mobile station with a least number of one-hop neighbors to be one of the receiver mobile station and the transmitter mobile station, wherein if a particular selected mobile station is unavailable the control unit is configured to select a next idle mobile station with the least number of one-hop neighbors to be one of the receiver mobile station and the transmitter mobile station.

11. The method of claim 1, further comprising receiving a second call request, by the control unit, and responsive to a determination that one of the receiver mobile station and the transmitter mobile station cannot be located for the second call request, denying the second call request.

12. The method of claim 1, wherein the plurality of narrowband mobile stations communicate with a site controller via a narrowband protocol and a sub-set of the plurality of narrowband mobile stations communicate with the site controller via a wideband protocol, wherein the site controller is configured to select a pair of mobile stations from the sub-set to act as a repeater to supply a new traffic channel.

13. The method of claim 1, wherein each of the plurality of narrowband mobile stations is assigned a priority level, depending on the role performed by each narrowband mobile station, wherein the control unit is assigned a higher priority level than all other narrowband mobile stations.

14. The method of claim 13, wherein if a priority level assigned to a narrowband mobile station is higher than a broadcasted trunking priority, the narrowband mobile station is configured to participate in the ad-hoc network.

15. An apparatus configured to control and manage a narrowband trunked network via a wideband network, the apparatus comprises:
a memory comprising instructions;
a processor coupled to the memory, when executing the instructions, configured to:
initiate operations of a control unit that is configured to control and manage trunking operations, via an ad-hoc network, for a plurality of narrowband mobile stations also forming the ad-hoc network according to a wide band protocol;
receive a call request over a narrowband control channel from a first mobile station of the plurality of narrowband mobile station;
assign at least one narrowband traffic channel from a plurality of available narrowband traffic channels for a call associated with the call request;
choose two mobile stations from the plurality of narrowband mobile stations to act as a repeater for the call, the two mobile stations including a respective receiver mobile station and a respective transmitter mobile station;
inform the receiver mobile station and the transmitter mobile station of the assignment to act as the narrowband repeater for the call and of the at least one assigned traffic channel for the call; and
grant the call request over the narrowband control channel, the grant including an indication of the at least one assigned traffic channel on which the respective receiver mobile station and the respective transmitter mobile station can be located for the call;
wherein the selecting comprises selecting a mobile station that is preconfigured with a value that indicates that the mobile station is to be selected as the control unit, wherein one mobile station of the plurality of narrowband mobile stations is preconfigured with the value.

* * * * *